May 18, 1926.
R. LEARMONT
1,584,953
SEAT OPERATED AIR STORAGE AND BRAKE
Filed April 29, 1925
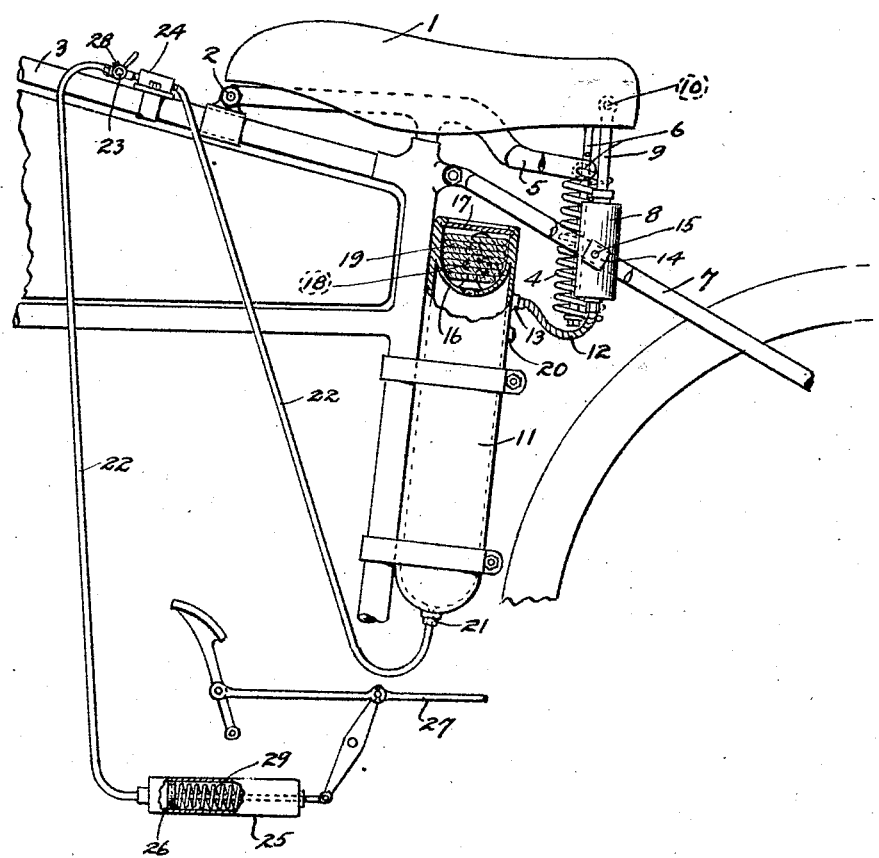
Inventor
RAY LEARMONT Patented May 18, 1926.

1,584,953

UNITED STATES PATENT OFFICE.

RAY LEARMONT, OF BOOROWA, NEW SOUTH WALES, AUSTRALIA.

SEAT-OPERATED AIR STORAGE AND BRAKE.

Application filed April 29, 1925. Serial No. 26,782.

This invention relates to automatic air compression and storage means together with brake operating connections for motorcycle or other road vehicles.

The principal objects of this invention are to provide means which will be automatically operated by the rider of the vehicle through his weight in bouncing up and down on the seat or saddle of the vehicle, especially when traveling along rough roads, and which will compress and store air in a tank on the vehicle, also means of transmitting the stored air to the brakes or other devices on the vehicle; also the provision of gauges, safety and other valves in certain relation to the rider of the vehicle so as to realize the greatest advantage of the installation.

In the drawings hereto the figure represents in elevation the central portion of a motorcycle showing the relation of the saddle to the associated parts as well as the brake control to the rear wheel and also showing my invention in place with portions of it in section to reveal the interior construction.

Numeral 1 designates the saddle of the cycle pivoted at 2 to the frame 3 of the cycle so that its rear end is free to rise and fall with the motion of the rider's body, and is resiliently sustained by two spiral springs 4 at either side of the rear end of the saddle suspended from one end by an extension 5 from the frame and each pivotally connected to the saddle frame by rods 6 extending from the other ends of the springs.

This spring suspension of the saddle is only illustrative, as many forms exist, all free to rise and fall with the rider and it is through this movement that my invention is made to function.

Pivotally supported to and between the rear frame braces 7 is an air pump cylinder 8 having a piston within it connected to a rod 9 which is in turn pivoted at its upper end 10 to the saddle frame so that in the up and down motion of the saddle the piston will be worked back and forth in the cylinder to pump the air therein to a storage tank 11 clamped to the frame of the cycle.

The pump piston is preferably single acting and may be of simple cup leather construction like any bicycle pump so it will not require an inlet check valve, or it may be a regular cylinder piston with rings and an inlet check valve this being merely a degree of refinement.

From the lower or discharge end of the pump a flexible metal hose 12 of small diameter extends to the tank 11 and at its point of entry to the tank is a check valve 13 to prevent pressure within the tank from returning to the pump. This check valve may, if desired, be placed on the outlet of the pump just preceding the metal hose instead of at the position shown, if desired.

The pivoted supports for the pump cylinder comprise trunnion blocks 14 clamped or otherwise secured to the rear frame braces 7 and in which trunnion blocks the cylinder is pivoted at 15.

Of course many other arrangements of the pump are possible, for the cylinder may be rigidly mounted with the usual wrist pin connections from rod 9 to the piston, or the pump may be disposed in any other plane and operated by suitable bell cranks or their equivalent, the object being to arrange the pump in whichever way is easiest or best to properly function with the particular saddle suspension or cycle frame arrangement and since these vary greatly applicant does not wish to be limited in this detail.

The air storage tank 11 may be placed at any convenient position on the machine but is here shown vertically arranged under the saddle and with its upper end concaved at 16 and provided with a hinged or sliding cover 17.

Within the concavity is an air cock 18 for drawing off compressed air for the inflation of tires or for any other purpose and secured to the cock is an air hose 19, long enough to reach either tire for inflation and when not in use it is coiled up around the cock within the concavity as shown, the lid serving to keep dust and rain from entering.

At some convenient place on the tank such as at 20 is a safety blow off valve to guard against over pressure in the tank and from some other point such as 21 a pipe or flexible metal hose 22 is led off for operating the brake of the vehicle.

This hose extends to a point on the frame easily reached by the rider and is there provided with a valve 23 and just before the valve and air pressure gauge 24. From the valve the hose extends downward to the brake operating cylinder 25 having a plunger 26 within it linked or otherwise connected with the brake pull rod 27 as indicated.

Upon shutting off the valve 23 the pipe line to the brake is exhausted through a port 28 in the valve so that a spring 29 will return the plunger 26 to release the brake.

From the above description it will be seen that invention also lies in the particular arrangement of parts into a complete air brake and air storage system for a cycle car operated by the rider's weight in bouncing on the seat, also that the system provides accessible means for manual control of the brake, visible means of determining the pressure of the air, and of concealed tire inflation connections, and in functioning the device forms a shock absorber for the saddle.

I claim:

1. In a motor cycle, a compressed air storage tank, a pump connected for delivering air to the tank and connected for operation by the seat of the vehicle through the bouncing movement of the rider thereon.

2. In a motorcycle, a compressed air storage tank, a pump connected for delivering air to the tank and connected for operation by the seat of the vehicle through the bouncing movement of the rider thereon, a brake actuating air line leading from the tank having a control valve thereon accessible for manual manipulation by the rider.

3. In a motorcycle, a compressed air storage tank, a pump connected for delivering air to the tank and connected for operation by the seat of the vehicle through the bouncing movement of the rider thereon, a brake actuating air line leading from the tank having a control valve thereon accessible for manual manipulation by the rider and a pressure gage on said line between the tank and the valve in a position to be visible to the rider when upon the seat.

4. In a vehicle of the character described a seat arranged to rise and fall with a rider in bouncing over the road, an air pump connected for operation to the seat upon the up and down movement thereof.

5. In a vehicle of the character described a seat arranged to rise and fall with a rider in bouncing over the road, an air pump connected for operation to the seat upon the up and down movement thereof, said pump being of the plunger type and pivotally mounted to the frame of the vehicle and pivotally connected to the frame of the seat.

6. In a vehicle of the character described, a saddle, an air storage tank, means for pumping air into said tank connected to the saddle for operation thereby through weight of a rider bouncing thereon, said tank having a recessed portion with an air delivery cock from the tank positioned therein.

7. In a vehicle of the character described, a saddle, an air storage tank, means for pumping air into said tank connected to the saddle for operation thereby through weight of a rider bouncing thereon, said tank having a recessed portion with an air delivery cock from the tank positioned therein, a hose secured to the cock adapted to be coiled around the cock within the recess, and a lid on the tank covering the recess.

8. In a vehicle of the character described, a cylindrical air storage tank with a concaved end, an air cock positioned within the recess adapted for drawing air from the tank.

RAY LEARMONT.